United States Patent
Uetake et al.

(10) Patent No.: US 10,332,551 B2
(45) Date of Patent: Jun. 25, 2019

(54) WARP CORRECTION APPARATUS FOR PLATE-LIKE WORKPIECE AND WARP CORRECTION METHOD

(71) Applicant: NHK SPRING CO., LTD., Yokohama-shi, Kanagawa (JP)

(72) Inventors: Hiroyoshi Uetake, Komagane (JP); Yukihiro Hayashi, Komagane (JP)

(73) Assignee: NHK SPRING CO., LTD., Kanagawa (JP)

( * ) Notice: Subject to any disclaimer, the term of this patent is extended or adjusted under 35 U.S.C. 154(b) by 745 days.

(21) Appl. No.: 14/869,097

(22) Filed: Sep. 29, 2015

(65) Prior Publication Data

US 2016/0125918 A1 May 5, 2016

(30) Foreign Application Priority Data

Oct. 30, 2014 (JP) .................................. 2014-221112

(51) Int. Cl.
*G11B 5/48* (2006.01)

(52) U.S. Cl.
CPC .................................. *G11B 5/4833* (2013.01)

(58) Field of Classification Search
CPC ... B21D 1/02; B21D 1/10; B21D 1/06; B21D 1/00; B25J 9/0096; B25J 11/005; G11B 5/4833
See application file for complete search history.

(56) References Cited

U.S. PATENT DOCUMENTS

| 3,396,917 A | * | 8/1968 | Carter | ........................ H05F 3/00 |
| | | | | 242/564.4 |
| 4,411,576 A | * | 10/1983 | Smith | .................... B23P 19/006 |
| | | | | 294/116 |
| 2012/0174644 A1 | | 7/2012 | Chazal et al. | |

FOREIGN PATENT DOCUMENTS

| CN | 201283377 Y | 8/2009 |
| CN | 201371180 Y | 12/2009 |
| CN | 201482829 U | 5/2010 |
| JP | S61158316 U | 10/1986 |
| JP | 62032650 Y | * 8/1987 |
| JP | S63260407 A | 10/1988 |
| JP | 01262022 A | 10/1989 |
| JP | 02214643 A | 8/1990 |

(Continued)

OTHER PUBLICATIONS

Chinese Office Action (and English translation thereof) dated Mar. 27, 2017, issued in counterpart Chinese Application No. CN 201510728252.

(Continued)

*Primary Examiner* — Livius R. Cazani
(74) *Attorney, Agent, or Firm* — Holtz, Holtz & Volek PC

(57) ABSTRACT

A warp correction apparatus includes an elastic mat, a first sheet supply unit which supplies a first clean sheet on the elastic mat, a workpiece holding mechanism which supplies the plate-like workpiece (a frame unit) on the first clean sheet, a second sheet supply unit which supplies a second clean sheet above the first clean sheet, a pressure roller, a first elevator unit which moves the second clean sheet up and down, a second elevator unit which presses the pressure roller toward the elastic mat, and a roller moving mechanism. The pressure roller is moved along an upper surface of the elastic mat by the roller moving mechanism while the frame unit is sandwiched between the elastic mat and the pressure roller.

8 Claims, 10 Drawing Sheets

(56) References Cited

FOREIGN PATENT DOCUMENTS

| | | | |
|---|---|---|---|
| JP | 2002192232 A | * | 7/2002 |
| JP | 2004149134 A | | 5/2004 |
| JP | 2004181497 A | | 7/2004 |
| JP | 5273271 B1 | | 8/2013 |
| JP | 5365944 B1 | | 12/2013 |
| WO | 2011029485 A1 | | 3/2011 |
| WO | 2011145617 A1 | | 11/2011 |

OTHER PUBLICATIONS

Japanese Office Action (and English language translation thereof) dated May 22, 2018 issued in counterpart Japanese Application No. 2014-221112.

* cited by examiner

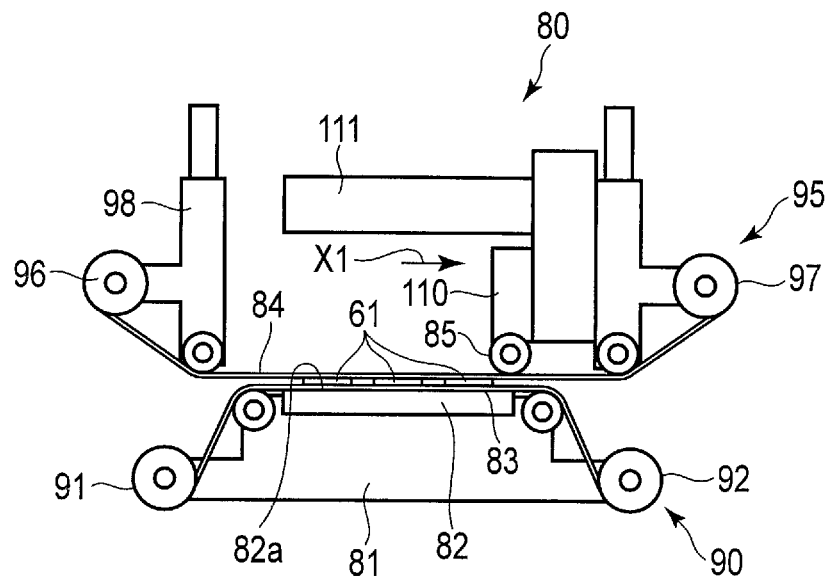
F I G. 15
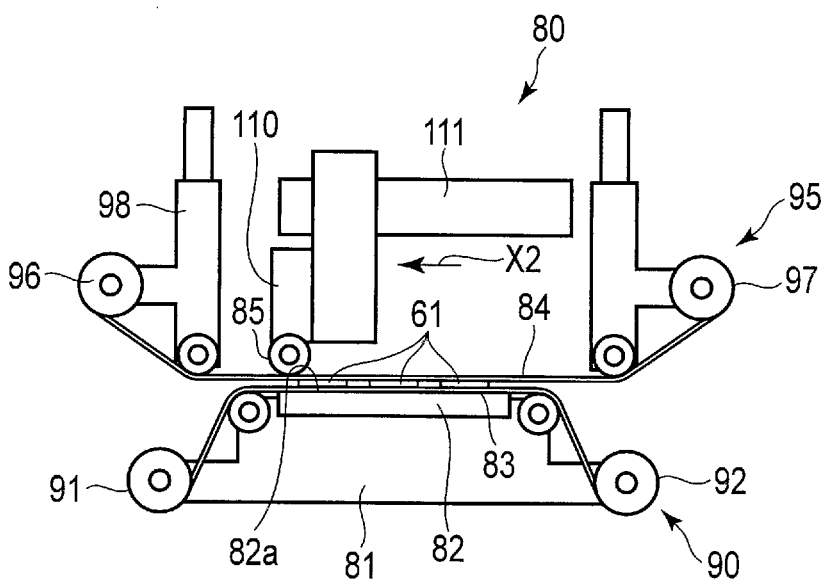
F I G. 16

WARP CORRECTION APPARATUS FOR PLATE-LIKE WORKPIECE AND WARP CORRECTION METHOD

CROSS-REFERENCE TO RELATED APPLICATIONS

This application is based upon and claims the benefit of priority from prior Japanese Patent Application No. 2014-221112, filed Oct. 30, 2014, the entire contents of which are incorporated herein by reference.

BACKGROUND OF THE INVENTION

1. Field of the Invention

The present invention relates to a correction apparatus for correcting warping of a plate-like workpiece such as a frame unit which has been cut out from a flexure chain blank sheet for example, and a warp correction method.

2. Description of the Related Art

A hard disk drive (HDD) is used in an information processing apparatus, such as a personal computer. The hard disk drive comprises a magnetic disk rotatable about a spindle, carriage turnable about a pivot, etc. On an arm of the carriage, a disk drive suspension (which will be hereinafter simply referred to as a suspension) is provided. The suspension comprises elements such as a load beam, and a flexure disposed to overlap the load beam. A magnetic head including a slider is mounted on a gimbal portion formed near a distal end of the flexure. The magnetic head is provided with elements for accessing data, that is, for reading and writing data. The load beam and the flexure, etc., constitute a head gimbal assembly.

Various types of flexures have been put to practical use according to the required specification. As an example of the flexure, a flexure with conductors is known. The flexure with conductors includes a metal base made of a thin stainless steel plate, an insulating layer made of an electrically insulating material, such as polyimide, which is formed on the metal base, and a plurality of conductors formed on the insulating layer.

Conventionally, as a means for enhancing the manufacturing efficiency of the flexure, a flexure chain blank sheet disclosed in, for example, JP 5,273,271 B (Patent Literature 1) and JP 5,365,944 B (Patent Literature 2) is known. In order to manufacture the flexure chain blank sheet, a number of flexure elements having the same shape are formed by etching a single stainless steel plate, for example. Further, a conductive circuit portion is formed on each of the flexure elements.

The flexure chain blank sheet is constituted by arranging a plurality of frame units longitudinally or laterally relative to the sheet. Each of the frame units which constitute the flexure chain blank sheet comprises a frame portion and a number of flexure elements arranged at predetermined pitches within the frame portion. In this specification, of the front side and back side of the frame unit, the side on which the conductive circuit portion is provided is referred to as a first surface, and the side opposite to the conductive circuit portion is referred to as a second surface.

The flexure chain blank sheet is cut off for each of the frame units in the manufacturing process of a flexure. That is, a plurality of frame units are cut out from a single flexure chain blank sheet. A frame unit cut out from the flexure chain blank sheet is an example of a plate-like workpiece. For each of the flexure elements provided in the frame unit, operations such as bending processing and mounting on a load beam are performed.

Stress produced in the process of manufacture may remain in the flexure chain blank sheet. Also, by a difference in the thermal expansion or moisture absorptivity, etc., between the conductive circuit portion and the metal base, there are cases where stress remains in the flexure chain blank sheet. Accordingly, even if the flexure chain blank sheet looks straight and planar at a glance, stress is released when the frame unit is cut out from the flexure chain blank sheet, or the flexure elements are individually cut off from the frame portion of the frame unit, which causes the flexure elements to warp. In particular, the first surface (the side on which the conductive circuit portion is provided) may have slight concave warping. Such warping may be called a "recessed warp".

For example, when some kind of process is to be performed for the flexure element while the conductive circuit portion of the flexure element is made to face upward, pins may be inserted into positioning holes formed near both ends of the flexure element, respectively. However, when the flexure element has the aforementioned "recessed warp", the positioning accuracy is degraded, such as pins which are inserted into the positioning holes tending to detach easily. Accordingly, depending on a process of handling the flexure element, it is sometimes more convenient if the first surface (the side on which the conductive circuit portion is provided) warps with the first surface being convex (i.e., to have the so-called upward warp).

BRIEF SUMMARY OF THE INVENTION

Accordingly, the object of the present invention is to provide a warp correction apparatus which corrects warping of a plate-like workpiece having a first surface and a second surface such that a desired surface of the first surface and the second surface becomes convex, and a method of correcting warping in such a plate-like workpiece.

An embodiment relates to a warp correction apparatus which corrects warping of a plate-like workpiece including a first surface and a second surface, and the warp correction apparatus comprises: an elastic mat including a flat upper surface; a first sheet supply unit configured to supply a first clean sheet on the upper surface of the elastic mat; a workpiece holding mechanism configured to supply the plate-like workpiece on the first clean sheet; a second sheet supply unit configured to supply a second clean sheet above the first clean sheet; a first elevator unit configured to move the second clean sheet up and down relatively with respect to the first clean sheet; a pressure roller which is movable and disposed above the second clean sheet; a second elevator unit configured to press the pressure roller toward the elastic mat; and a roller moving mechanism configured to move the pressure roller along the upper surface of the elastic mat in a state in which the pressure roller is lowered.

According to the structure of this embodiment, it is possible to correct warping of a plate-like workpiece, such as a frame unit which has been cut out from a flexure chain blank sheet, in such a way that a surface on one specific side of the plate-like workpiece becomes convexly curved.

For example, the elastic mat is formed of a resin foam having elasticity, and the pressure roller is made of an elastic material harder than the elastic mat. An example of the first sheet supply unit includes a first supply bobbin configured to deliver an unused portion of the first clean sheet on the elastic mat, and a first take-up bobbin configured to take up a used portion of the first clean sheet on the elastic mat. An example of the second sheet supply unit includes a second supply bobbin configured to deliver an unused portion of the second clean sheet on the first clean sheet, and a second take-up bobbin configured to take up a used portion of the second clean sheet. An ion generator for preventing static electricity from accumulating on the first clean sheet and the second clean sheet may further be provided.

An example of the plate-like workpiece is formed of a frame unit comprising a frame portion, and a plurality of flexure elements formed within the frame portion. The workpiece holding mechanism places the frame unit on the first clean sheet such that a longitudinal direction in each of the flexure elements agrees with a longitudinal direction in the upper surface of the elastic mat. A first positioning hole formed on a side near one of ends of the frame unit in a longitudinal direction, and a second positioning hole formed on a side near the other end in the longitudinal direction may further be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 15 is a side view illustrating that the pressure roller has moved in a first direction.

FIG. 16 is a side view illustrating that the pressure roller has moved in a second direction.

DETAILED DESCRIPTION OF THE INVENTION

A warp correction apparatus for a plate-like workpiece, and a warp correction method according to one embodiment will be hereinafter described with reference to FIGS. 1 to 18.

Figure 1:
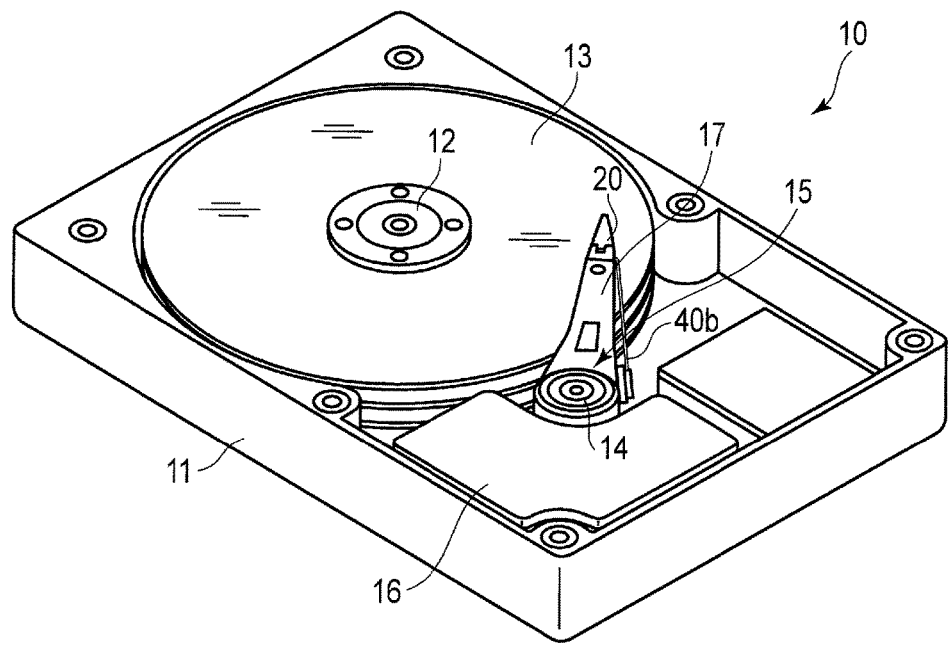
FIG. 1 is a perspective view showing an example of a disk drive.

A hard disk drive (HDD) 10 shown in FIG. 1 comprises a case 11, disks 13 rotatable about a spindle 12, a carriage 15 turnable about a pivot 14, and a positioning motor 16 for turning the carriage 15. The case 11 is sealed by a lid (not shown).

Figure 2:
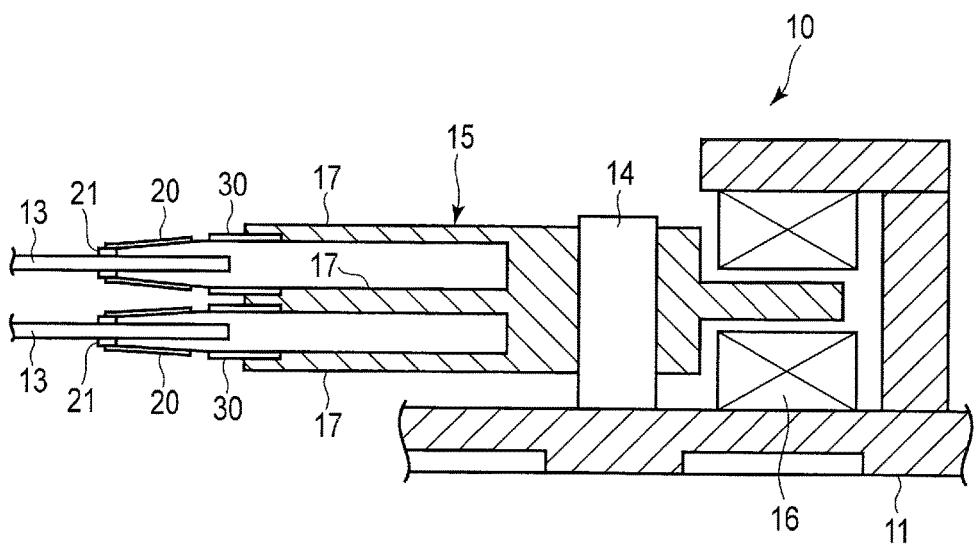
FIG. 2 is a cross-sectional view of a part of the disk drive shown in FIG. 1.

FIG. 2 is a cross-sectional view schematically showing a part of the disk drive 10. The carriage 15 is provided with arms 17. At a distal end portion of each arm 17, a disk drive suspension (hereinafter simply referred to as a suspension) 20 is mounted. At a distal end of the suspension 20, a slider 21 which serves as a magnetic head is provided. As each disk 13 rotates at high speed, an air bearing is formed between the disk 13 and the slider 21.

If the carriage 15 is turned by the positioning motor 16, the suspension 20 moves radially relative to the disk 13, and the slider 21 thereby moves to a desired track of the disk 13. The slider 21 is provided with a magnetic coil for recording data on the disk 13, a magneto resistive (MR) element for reading data recorded on the disk 13, etc. The MR element converts a magnetic signal recorded on the disk 13 into an electrical signal.

Figure 3:
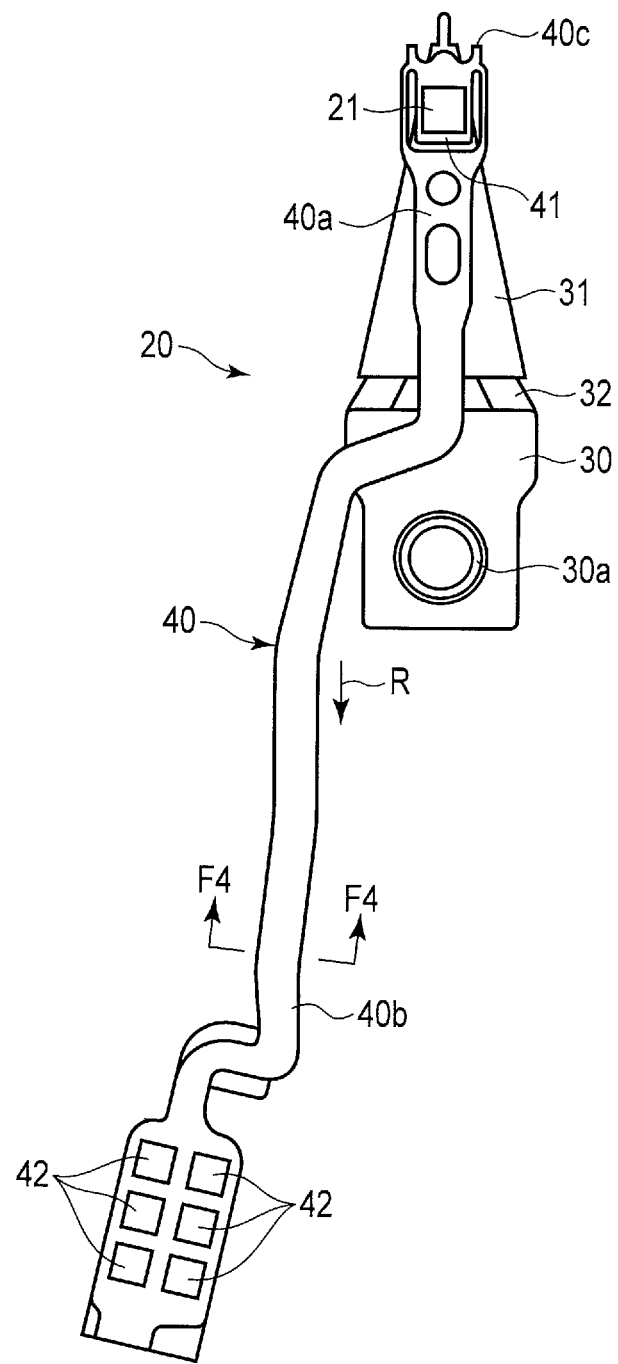
FIG. 3 is a plan view showing an example of a suspension.

FIG. 3 shows an example of the suspension 20. The suspension 20 comprises a baseplate 30, a load beam 31, a hinge portion 32, and a flexure 40 with conductors. The flexure 40 with conductors may be simply referred to as the flexure 40. A boss portion 30a of the baseplate 30 is secured to the arm 17 (FIGS. 1 and 2) of the carriage 15.

The flexure 40 includes a proximal portion 40a overlapping the load beam 31, and a tail portion 40b extending toward the back (i.e., in the direction indicated by arrow R in FIG. 3) of the baseplate 30 from the proximal portion 40a. The proximal portion 40a of the flexure 40 is secured to the load beam 31 by fixing means such as laser welding. A tongue 41 is formed near a distal end portion 40c of the flexure 40. The slider 21 (FIGS. 2 and 3) is mounted on the tongue 41. A plurality of tail electrodes 42 are formed in the tail portion 40b.

Figure 4:
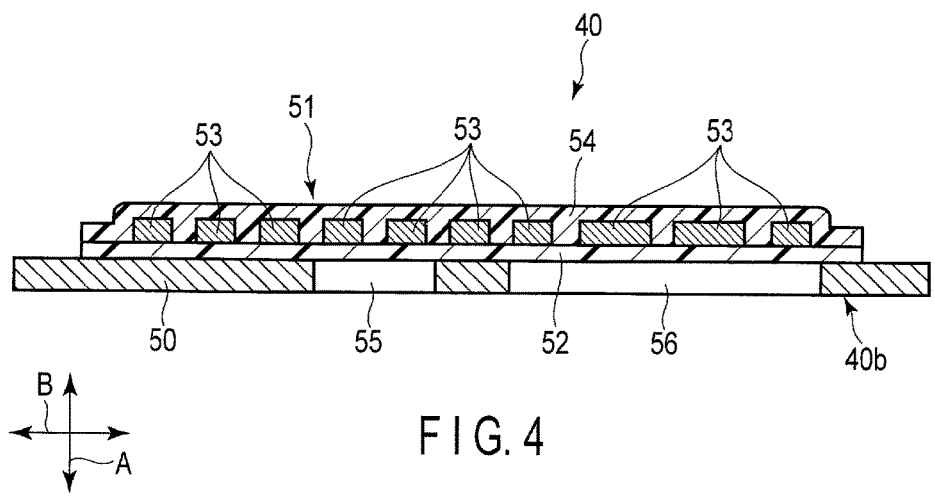
FIG. 4 is a cross-sectional view of a flexure taken along line F4-F4 of FIG. 3.
Figure 6:
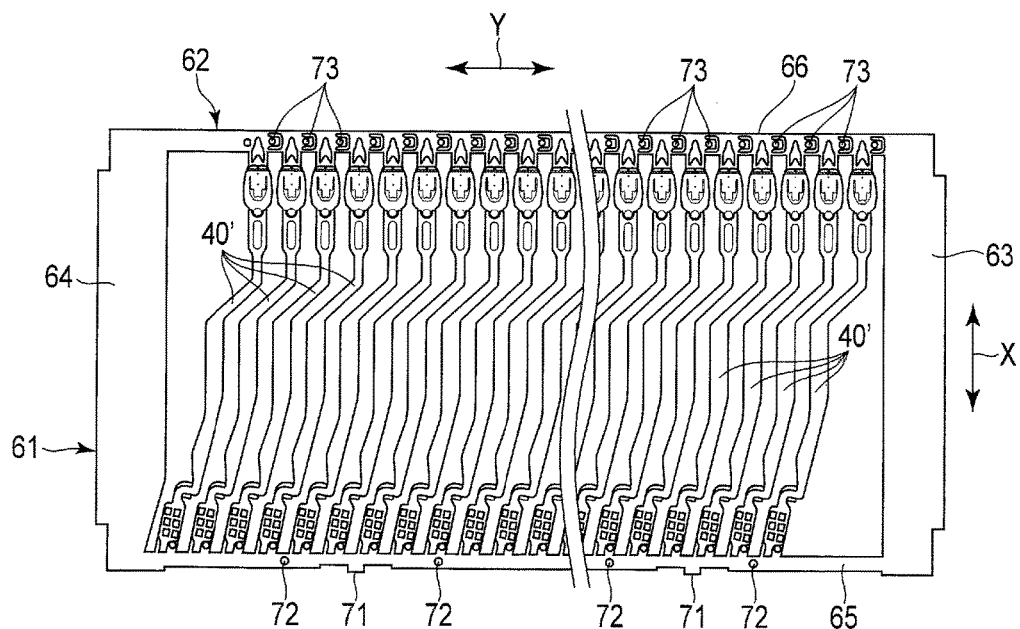
FIG. 6 is a plan view of a plate-like workpiece (a frame unit) which has been cut out from the flexure chain blank sheet shown in FIG. 5.

FIG. 4 is a cross-sectional view of a part of the flexure 40. The flexure 40 includes a metal base 50 obtained by etching a plate of austenitic stainless steel, for example, and a conductive circuit portion 51 formed along the metal base 50. The thickness of the metal base 50 is less than that of the load beam 31. The thickness of the load beam 31 is, for example, 30 to 62 μm, and the thickness of the metal base 50 is, for example, 18 μm (12 to 25 μm).

The conductive circuit portion 51 includes an insulating layer 52 formed on the metal base 50, a plurality of conductors 53 made of copper which are formed on the insulating layer 52, and a cover layer 54. Each of the insulating layer 52 and the cover layer 54 is formed of an electrically insulating material such as polyimide. Openings 55 and 56 may be formed at a part of the metal base 50. Double-headed arrow A in FIG. 4 indicates the thickness direction of the flexure 40, and double-headed arrow B indicates the width direction.

Figure 5:
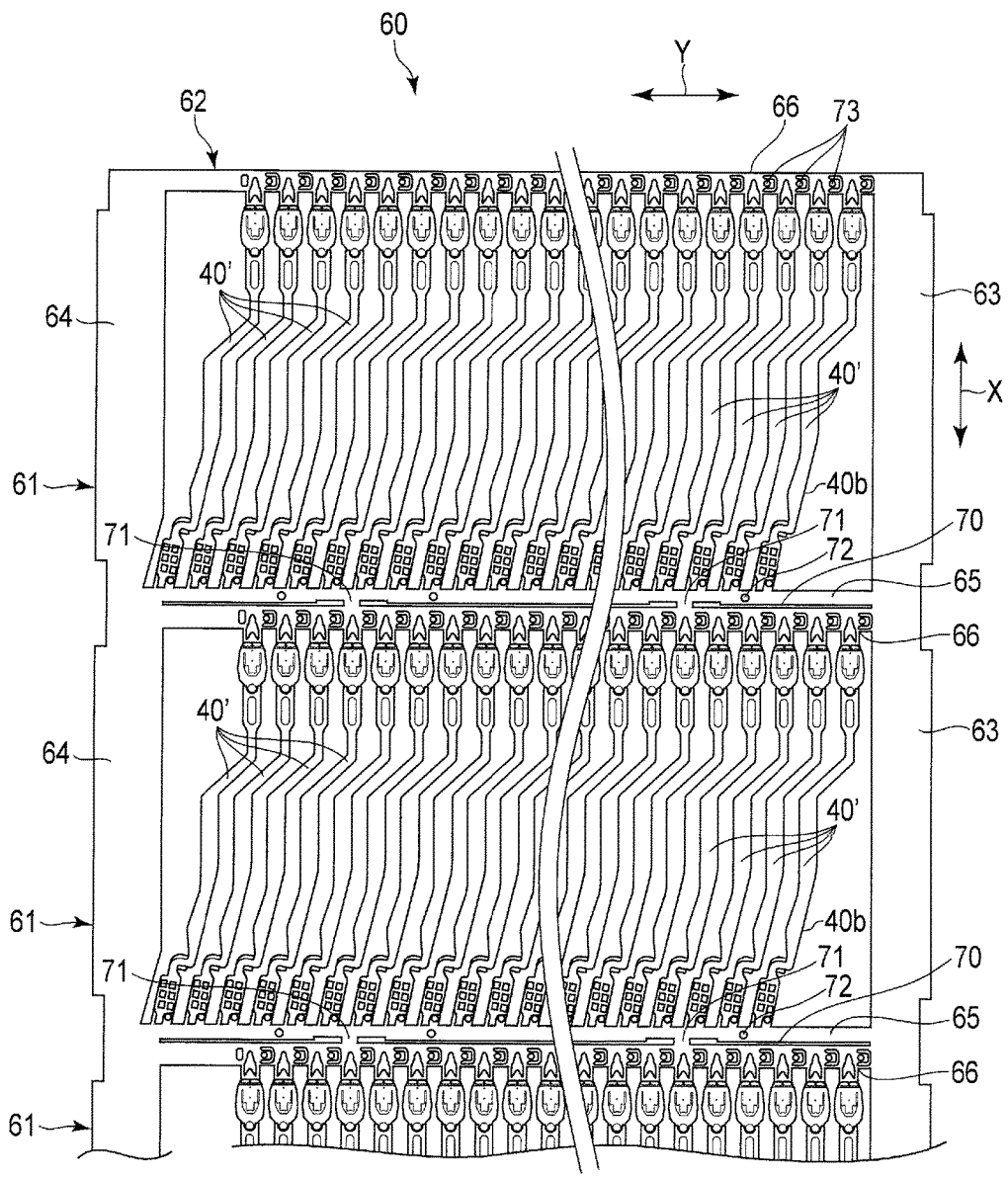
FIG. 5 is a plan view of a part of a flexure chain blank sheet.

FIG. 5 is a plan view showing a part of a flexure chain blank sheet 60 used in a process of manufacturing the flexure 40. The flexure chain blank sheet 60 includes a plurality of frame units 61. Each of the frame units 61 includes a frame portion 62 constituted of the metal base 50, and a plurality of (several tens of to several hundreds of) flexure elements 40' formed at predetermined pitches within the frame portion 62.

Each of the flexure elements 40' includes the metal base 50 (FIG. 4) and the conductive circuit portion 51 formed on the metal base 50, which are the constituent elements of the flexure 40. As in the tail portion 40b of the flexure 40 shown in FIG. 4, the conductive circuit portion 51 includes the insulating layer 52 formed on the metal base 50, the conductors 53 made of copper which are formed on the insulating layer 52, and the cover layer 54 covering these conductors 53.

The frame portion 62 of the frame unit 61 includes a pair of lengthwise frames 63 and 64 extending longitudinally relative to the flexure element 40' (as indicated by double-headed arrow X in FIGS. 5 and 6), and a pair of lateral frames 65 and 66 extending laterally relative to the flexure element 40' (as indicated by double-headed arrow Y). By the lengthwise frames 63 and 64 and the lateral frames 65 and 66, the frame portion 62 which is continuous all around the frame unit 61 is formed.

A slit 70 and a connection portion 71 are formed between lateral frame 65 of one frame unit 61 of the frame units 61 which are adjacent longitudinally relative to the flexure chain blank sheet 60 (as indicated by double-headed arrow X in FIG. 5) and lateral frame 66 of the other frame unit 61. By the connection portion 71, the frame units 61 are connected to each other.

A first positioning hole 72 is formed in lateral frame 65, which is one of the lateral frames. In the manufacturing process of the flexure 40, in order to keep the flexure chain blank sheet 60 at a predetermined position, a first positioning pin may be inserted into the positioning hole 72. A second positioning hole 73 is formed in the lateral frame 66, which is the other one of the lateral frames. In the manufacturing process of the flexure 40, a second positioning pin may be inserted into the positioning hole 73. The positioning holes 72 and 73 are usually formed near end portions of the flexure element 40' in the longitudinal direction thereof, respectively, in order to increase the positioning accuracy. That is, the first positioning hole 72 is formed on a side near one end of the frame unit 61 in the longitudinal direction, and the second positioning hole 73 is formed on a side near the other end in the longitudinal direction.

Figure 7:
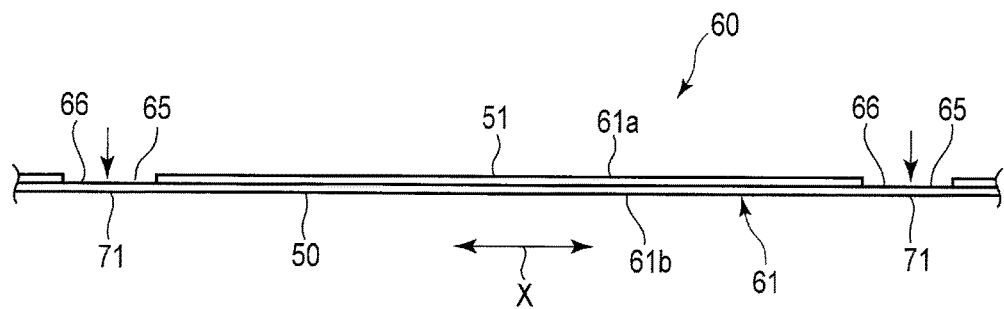
FIG. 7 is a side view which schematically shows the flexure chain blank sheet.

FIG. 7 is a side view which schematically shows a part of the flexure chain blank sheet 60. Double-headed arrow X in FIG. 7 indicates the longitudinal direction of the flexure element 40'. In this specification, the side on which the conductive circuit portion 51 of the flexure chain blank sheet 60 is provided is referred to as a first surface 61a, and the side opposite to the conductive circuit portion 51 is referred to as a second surface 61b.

Stress produced in the manufacturing process may remain in the flexure chain blank sheet 60. Also, by a difference in the thermal expansion or moisture absorptivity, etc., between the conductive circuit portion 51 and the metal base 50, there are cases where stress remains. However, since the frame units 61 are connected to each other by the connection portion 71, at first glance, the flexure chain blank sheet 60 appears to have a straight planar shape, as shown in FIG. 7.

Figure 8:
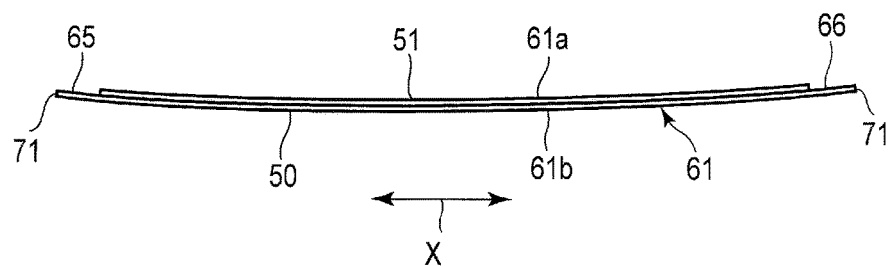
FIG. 8 is a side view which schematically shows an example of a first surface of the plate-like workpiece (the frame unit) which has been cut out from the flexure chain blank sheet being warped in a concave shape.

If, however, the connection portion 71 of the flexure chain blank sheet 60 is cut off, and each of the frame units 61 is brought into an independent unit, as shown in FIG. 8, because the stress existed in the frame unit 61 is released by the cutting, the frame unit 61 warps as shown in FIG. 8. In particular, there may be occurrence of warping (the so-called recessed warp) in which the first surface 61a (i.e., the side on which the conductive circuit portion 51 is provided) is slightly curved inwardly.

In the manufacturing process of the flexure 40, when the flexure element 40' is handled while the conductive circuit portion 51 of the frame unit 61 is made to face upward, pins may be inserted into the positioning holes 72 and 73 in order to position the frame unit 61. In that case, when the first surface 61a has a concave shape (recessed warp), a problem arises in terms of the positioning accuracy and positioning simplicity, such as having the problem that the pins inserted into the positioning holes 72 and 73 tend to detach easily.

Figure 9:
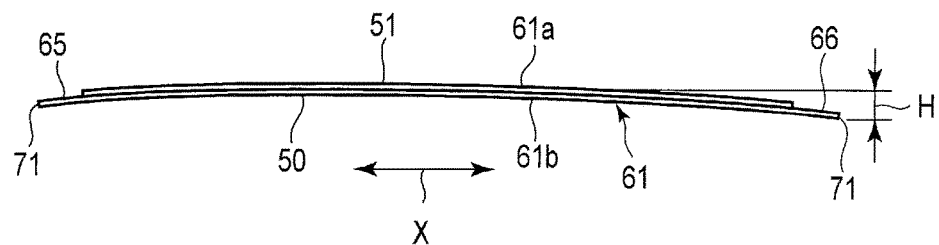
FIG. 9 is a side view which schematically shows an example of the first surface of the plate-like workpiece shown in FIG. 8 corrected so that it becomes convex.

For this reason, depending on the process of handling the flexure element 40', it is sometimes more convenient if the first surface 61a has a convex shape (the so-called upward warp), as shown in FIG. 9. Hence, as described below, in the present embodiment, a correction apparatus 80 for correcting warping of the frame unit 61 which has been cut out from the flexure chain blank sheet 60, and a correction method are disclosed.

Figure 10:
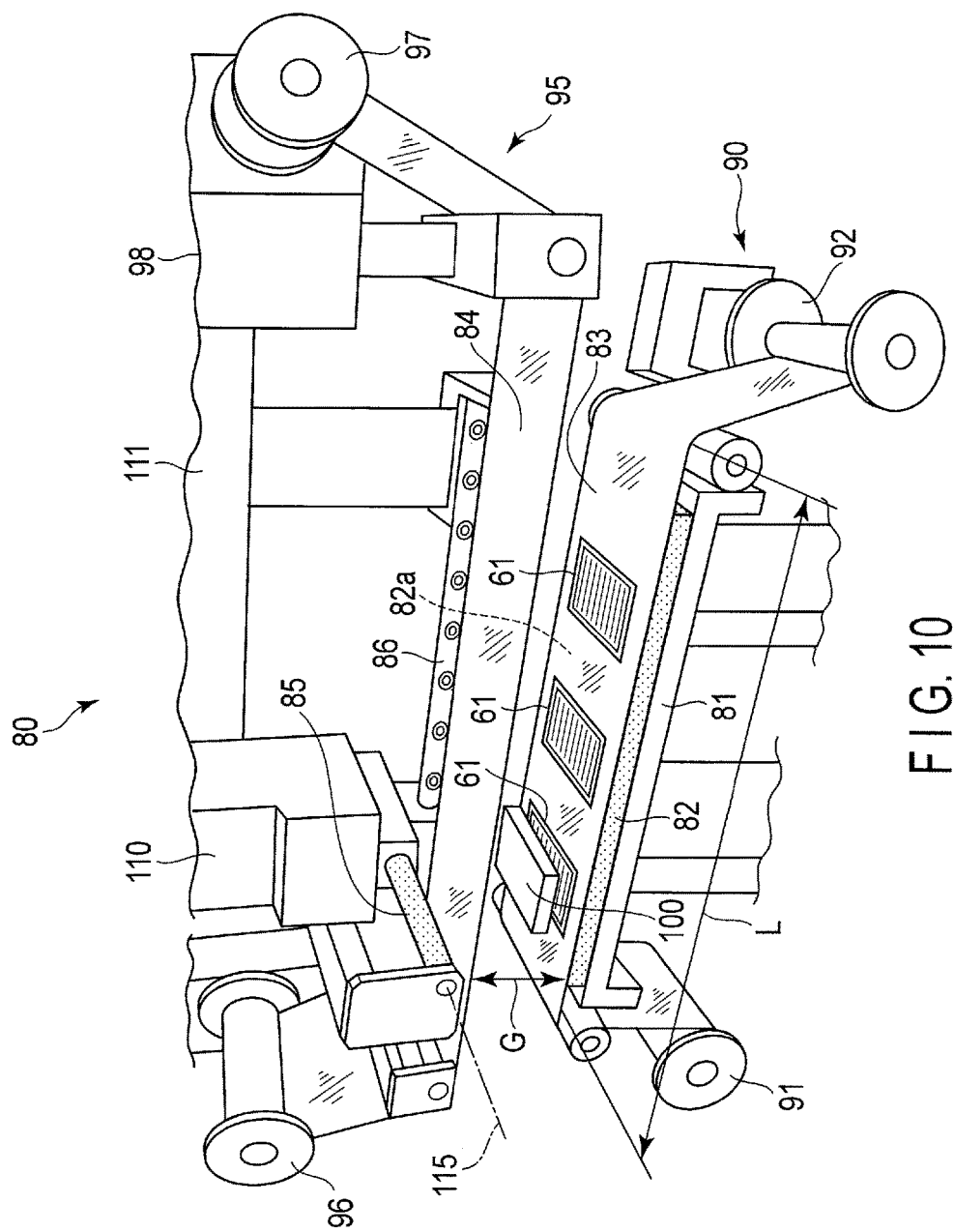
FIG. 10 is a perspective view of a part of a warp correction apparatus according to one embodiment.

FIGS. 10 to 18 show the warp correction apparatus 80. The warp correction apparatus 80 is capable of correcting the warping of the frame unit 61, which is an example of a plate-like workpiece. FIG. 10 is a perspective view of the warp correction apparatus 80. Each of FIGS. 11 to 18 is a side view presented schematically to explain the operation of the correction apparatus 80.

The warp correction apparatus 80 comprises a base 81, an elastic mat 82 disposed on the base 81, a first clean sheet 83 disposed on the elastic mat 82, a second clean sheet 84 disposed on the first clean sheet 83, a pressure roller 85 disposed on the second clean sheet 84, etc.

The elastic mat 82 is formed like a plate. The elastic mat 82 has a flat upper surface 82a extending horizontally, and is secured to the base 81 such that it is parallel to the base 81. An example of the elastic mat 82 is formed of a foam of a resin (elastomer) having rubber elasticity, such as urethane foam, and has uniform hardness along its entire horizontal length. The thickness of the elastic mat 82 is, for example, approximately 1 to 5 cm, but the elastic mat 82 may have a thickness other than that as necessary.

The clean sheets 83 and 84 are made of a material which can keep the occurrence of dust and adhesion of dust to a minimum. The material may be, for example, a sheet made of continuous fibers or a resin film. An ion generator (an ionizer) 86 is disposed lateral to the clean sheets 83 and 84 in order to prevent accumulation of static electricity.

The first clean sheet 83 is supplied horizontally on the elastic mat 82 by predetermined length L by a first sheet supply unit 90. The first sheet supply unit 90 includes a first supply bobbin 91 and a first take-up bobbin 92. The first supply bobbin 91 delivers an unused portion of the first clean sheet 83 on the elastic mat 82 by a predetermined amount. The first take-up bobbin 92 takes up the used portion of the first clean sheet 83 on the elastic mat 82 by a predetermined amount.

The second clean sheet 84 is supplied on the first clean sheet 83 by length L, which is the same length as that of the first clean sheet 83, in synchronization with the first clean sheet 83 by a second sheet supply unit 95. The second sheet supply unit 95 includes a second supply bobbin 96 and a second take-up bobbin 97. The second supply bobbin 96 delivers an unused portion of the second clean sheet 84 on the first clean sheet 83 by a predetermined amount. The second take-up bobbin 97 takes up the used portion of the second clean sheet 84 by a predetermined amount.

The second sheet supply unit 95 is mounted on a first elevator unit 98 which can be moved up and down. The first elevator unit 98 is moved up and down between a descent limit and an ascent limit by an elevator mechanism including a servo motor and a ball screw. When the second sheet supply unit 95 is moved to the descent limit, the second clean sheet 84 overlaps the first clean sheet 83.

As shown in FIG. 10, in a state in which the second sheet supply unit 95 is moved to the ascent limit, gap G in which a workpiece holding mechanism 100 can be inserted is formed between the first clean sheet 83 and the second clean sheet 84. An example of the workpiece holding mechanism 100 is configured to hold the frame unit 61 by a negative pressure (vacuum). The workpiece holding mechanism 100 is mounted on a movable arm.

The workpiece holding mechanism 100 is inserted in gap G formed between the first clean sheet 83 and the second clean sheet 84. The workpiece holding mechanism 100 can place the frame unit (plate-like workpiece) 61 on the first clean sheet 83 one by one. Also, the workpiece holding mechanism 100 can take out the frame unit 61 placed on the first clean sheet 83 from the first clean sheet 83.

The pressure roller 85 is formed of a material (for example, hard rubber) having rubber elasticity that is harder than the elastic mat 82. When the hardness of the elastic mat 82 and that of the pressure roller 85 are compared, the pressure roller 85 is harder than the elastic mat 82. That is, when the surfaces of the two are pressed by a probe of a tester (that is, when a compressive load is applied), the depression of the elastic mat 82 is greater than that of the pressure roller 85.

The pressure roller 85 is mounted on a second elevator unit 110 which can be moved up and down. The second elevator unit 110 is moved up and down between a descent limit and an ascent limit by a driving mechanism including a servo motor and a ball screw. When the pressure roller 85 is moved to the descent limit, the warp correction apparatus 80 is brought into a state in which the frame unit 61 can be sandwiched between the elastic mat 82 and the pressure roller 85. The pressure force of the pressure roller 85 against the elastic mat 82 can be adjusted by a position of the descent limit of the pressure roller 85 and a degree of flexure of an elastic member (for example, a compression spring) incorporated in the second elevator unit 110.

By a roller moving mechanism 111 including a guide which extends horizontally, the second elevator unit 110 which moves the pressure roller 85 up and down is reciprocated longitudinally relative to the elastic mat 82. That is, the pressure roller 85 is moved longitudinally (horizontally) relative to the elastic mat 82 along the upper surface 82a of the elastic mat 82 between a first position shown in FIG. 14 and a second position shown in FIG. 15. The first position mentioned here is the position near one end of the elastic mat 82 in the longitudinal direction. The second position is the position near the other end of the elastic mat 82. The pressure roller 85 is rotatable about axis 115 extending horizontally. The axis 115 of the pressure roller 85 extends widthways relative to the elastic mat 82 (i.e., orthogonally to length L).

Next, the operation of the warp correction apparatus 80 will be described referring to FIGS. 11 to 18.

Figure 11:
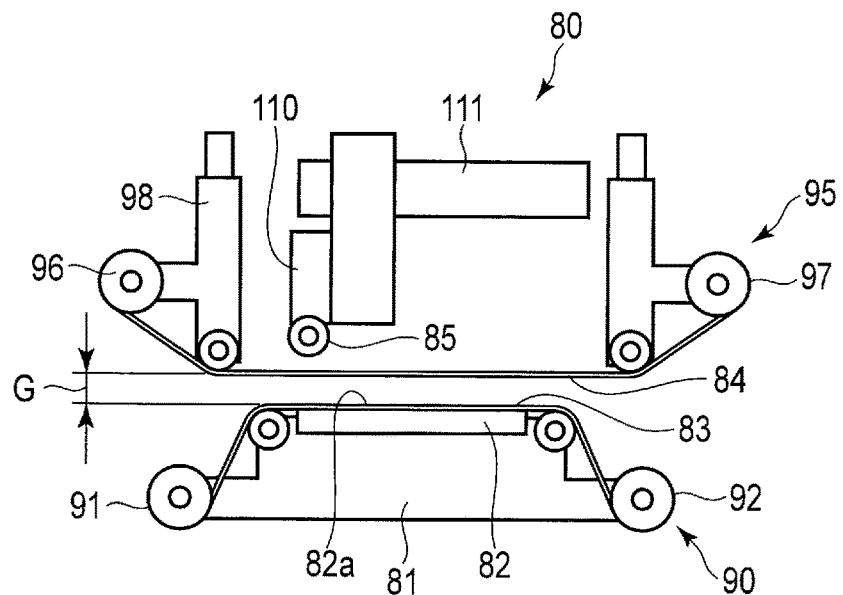
FIG. 11 is a side view which schematically shows the correction apparatus.

FIG. 11 shows the initial state of the warp correction apparatus 80. In this initial state, the first elevator unit 98 and the second elevator unit 110 are both at an ascended position. Since the second clean sheet 84 and the pressure roller 85 are raised, gap G is formed between the first clean sheet 83 and the second clean sheet 84.

Figure 12:
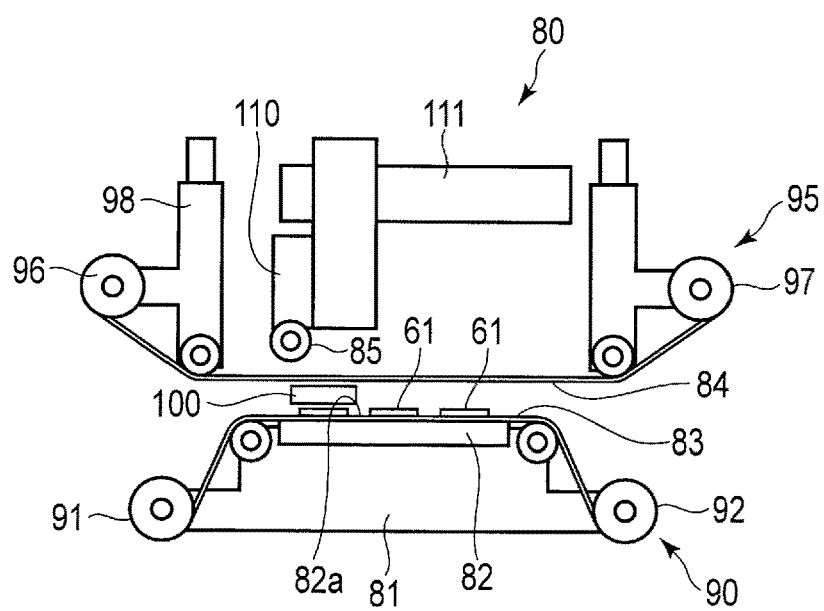
FIG. 12 is a side view which shows the state in which a plate-like workpiece is placed on a first clean sheet of the warp correction apparatus.

As shown in FIG. 12, as the workpiece holding mechanism 100 is inserted between the first clean sheet 83 and the second clean sheet 84, at least one frame unit 61 is supplied on the first clean sheet 83. At this time, the frame unit 61 is placed horizontally on the first clean sheet 83 in such a position that the conductive circuit portion 51 (that is, the first surface 61a) is made to face upward.

Moreover, the frame unit 61 is arranged such that the longitudinal direction in the flexure elements 40' (as indicated by double-headed arrow X in FIG. 6) agrees with the longitudinal direction in the first clean sheet 83 (as indicated by L in FIG. 10) when the frame unit 61 is placed on the first clean sheet 83. That is, the workpiece holding mechanism 100 places the frame unit 61 on the first clean sheet 83 such that the longitudinal direction in the flexure elements 40' agrees with the longitudinal direction in the upper surface 82a of the elastic mat 82.

Figure 13:
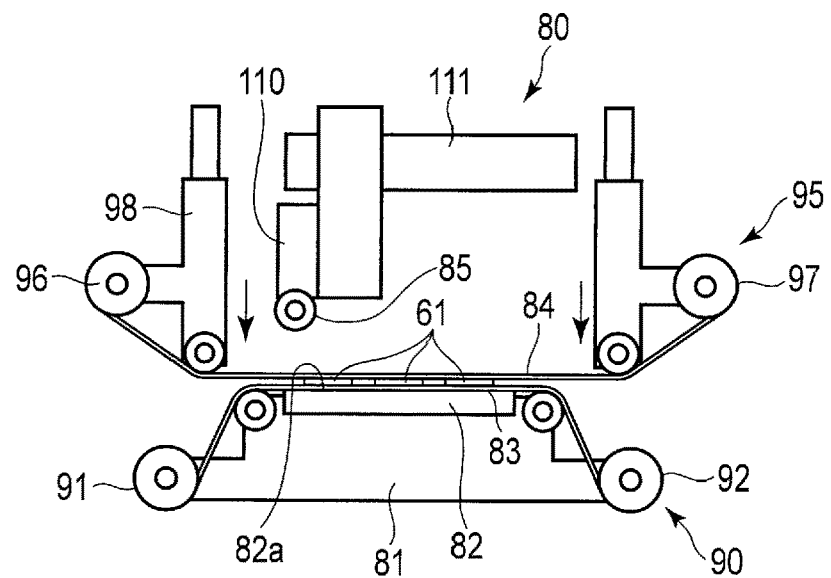
FIG. 13 is a side view illustrating that a second clean sheet of the warp correction apparatus is lowered.

Next, as shown in FIG. 13, the first elevator unit 98 is lowered and the second clean sheet 84 overlaps with the first clean sheet 83 and the frame unit 61. In this way, the frame unit 61 is sandwiched between the first clean sheet 83 and the second clean sheet 84.

Figure 14:
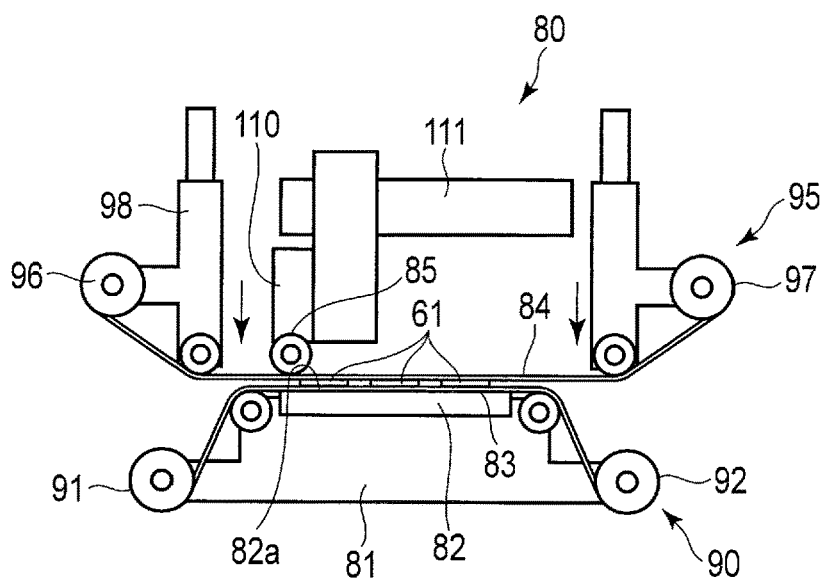
FIG. 14 is a side view illustrating that a pressure roller of the warp correction apparatus is lowered.

Next, as shown in FIG. 14, as the second elevator unit 110 is lowered, the pressure roller 85 is positioned on the descent limit. In this way, the clean sheets 83 and 84 are sandwiched between a lower end of the pressure roller 85 and the elastic mat 82. In this state, since the pressure roller 85 is positioned ahead the frame unit 61, the pressure roller 85 does not press the frame unit 61 at this time.

After that, as shown in FIG. 15, the second elevator unit 110 is moved in a first direction indicated by arrow X1 along the upper surface 82a of the elastic mat 82. The frame unit 61 is disposed between the clean sheets 83 and 84. Accordingly, in a state where the frame unit 61 is sandwiched between the elastic mat 82 and the pressure roller 85, the pressure roller 85 moves horizontally while pressing the frame unit 61.

Next, as shown in FIG. 16, as the pressure roller 85 is moved in a second direction indicated by arrow X2 along the upper surface 82a of the elastic mat 82, the pressure roller 85 returns to its original position. Also at this time, in a state where the frame unit 61 is sandwiched between the clean sheets 83 and 84, the pressure roller 85 moves horizontally while pressing the frame unit 61.

The pressure roller 85 is formed of a material which is harder than the elastic mat 82 (for example, hard rubber). Further, while the elastic mat 82 is planar, the pressure roller 85 is cylindrical. The frame unit 61 is sandwiched between the elastic mat 82 and the pressure roller 85. In this state, the pressure roller 85 moves longitudinally relative to the frame unit 61. Then, a compressive stress is produced on the first surface 61a of the frame unit 61 which is pressed by the pressure roller 85, that is, on a side on which the conductive circuit portion 51 is provided.

Therefore, when the frame unit 61 is brought to the free state (the state where no external force is applied), the frame unit 61 comes to be gradually curved (the so-called upward warp) so that the first surface 61a becomes slightly convex, as shown in FIG. 9. Although FIG. 9 depicts the frame unit 61 in an exaggerated manner so that the curvature of the frame unit 61 can be easily understood, the curvature of the actual frame unit 61 (height H of the first surface 61a shown in FIG. 9) takes on a small value which is greater than or equal to 0 μm and less than or equal to several hundreds of micrometers. In order to ensure that height H of the first surface 61a of the frame unit 61 after warp correction takes on a desired value, the hardness of the elastic mat 82 and the pressure roller 85, the diameter of the pressure roller 85, the pressure force of the pressure roller 85 against the elastic mat 82 (a load by a spring), and the like are optimized.

Figure 17:
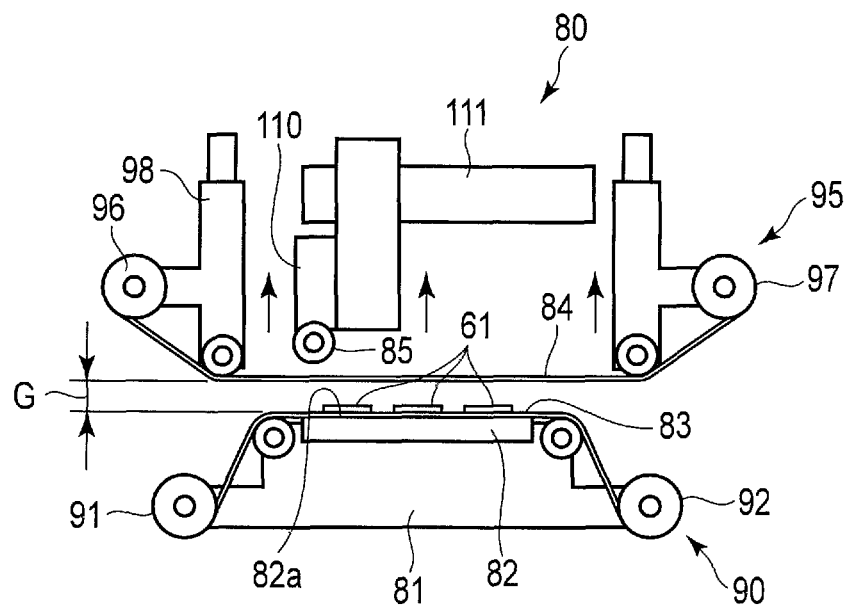
FIG. 17 is a side view illustrating that the pressure roller and the second clean sheet have been raised.

As shown in FIG. 17, the first elevator unit 98 and the second elevator unit 110 are raised, and the second clean sheet 84 and the pressure roller 85 are thereby raised. Consequently, gap G is formed between the first clean sheet 83 and the second clean sheet 84 again. As the workpiece holding mechanism 100 (FIG. 12) is inserted into this gap G, the frame unit 61 on the first clean sheet 83 is taken out by the workpiece holding mechanism 100.

When a series of warp correction process steps (FIGS. 11 to 17) described above is repeated several times, it is possible that a foreign matter such as dust will adhere to the clean sheets 83 and 84. If the foreign matter such as dust adhered to the clean sheets 83 and 84 are transferred to the surface of the frame unit 61, the quality of the flexure 40 may be degraded.

Figure 18:
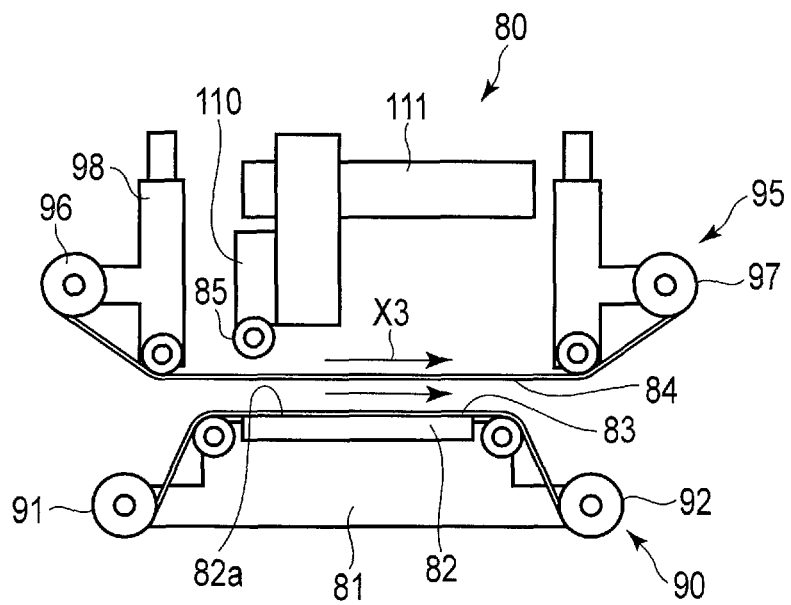
FIG. 18 is a side view which shows the direction in which the first clean sheet and the second clean sheet move.

Hence, in the present embodiment, as a dust-proof countermeasure, after the correction process (FIGS. 11 to 17) has been repeated several times, the clean sheets 83 and 84 are forwarded by fixed length L (FIG. 10), as shown in FIG. 18. In this way, unused new portions of the clean sheets 83 and 84 are disposed on the elastic mat 82, and the used portions of the clean sheets 83 and 84 are taken up. As a result, the foreign matter such as dust which may be adhered to the clean sheets 83 and 84 are caught in rolls of the clean sheets 83 and 84. After that, a series of correction process steps (FIGS. 11 to 17) is repeated again.

As described above, a method of manufacturing the frame unit (the plate-like workpiece) 61 of the present embodiment includes a manufacturing process of the frame unit 61 ([1] and [2] of the following), and a correction process ([3] to [9] of the following).

[1] The flexure chain blank sheet 60 comprising a plurality of frame units 61 is manufactured. Each of the frame units 61 includes the frame portion 62 and a number of flexure elements 40'.

[2] The frame units 61 of the flexure chain blank sheet 60 are cut off.

[3] The first clean sheet 83 is disposed on the elastic mat 82 (FIG. 11).

[4] The frame unit 61 is supplied on the first clean sheet 83 (FIG. 12).

[5] The second clean sheet 84 is laid over the first clean sheet 83 and the frame unit 61 from above (FIG. 13).

[6] The pressure roller 85 is lowered toward the elastic mat 82 from above the second clean sheet 84 (FIG. 14).

[7] The frame unit 61 is sandwiched between the elastic mat 82 and the pressure roller 85.

[8] The pressure roller 85 is moved along the upper surface 82a of the elastic mat 82 while the frame unit 61 is sandwiched between the elastic mat 82 and the pressure roller 85 (FIGS. 15 and 16).

[9] The frame unit 61 is taken out from the first clean sheet 83 (FIG. 17).

[10] After a series of the above correction process steps [3] to [9] has been repeated several times, the used portions of the clean sheets 83 and 84 are taken up by a predetermined amount, and unused portions of the clean sheets 83 and 84 are delivered on the elastic mat 82 (FIG. 18).

As described above, by performing a series of correction process steps [3] to [9] for the frame unit 61 which has been cut out from the flexure chain blank sheet, the frame unit 61 can be corrected such that the first surface 61a has a convexly curved shape. Accordingly, during an operation, etc., of handling the flexure element 40' in which it is desirable that the conductive circuit portion 51 have a convexly curved shape, it is possible to manage the warping of the flexure element 40' to be in a desirable state. Moreover, it is possible to prevent a foreign matter such as dust from adhering to the frame unit 61 by the above-described process [10] of intermittently supplying unused fresh portions of the clean sheets 83 and 84 at suitable timing. Accordingly, this process is advantageous in maintaining cleanliness of the flexure element 40' for which a high cleaning level is required.

When the pressure roller 85 is rolled on the elastic mat 82 via the clean sheets 83 and 84 as in the present embodiment, static electricity is likely to accumulate on the clean sheets 83 and 84. When the clean sheets 83 and 84 become electrostatically charged, a workpiece (for example, the frame unit 61) is attracted to the clean sheets 83 and 84, and the position of the workpiece may be shifted. Displacement of the workpiece may adversely affect the warp correction operation or adsorption of the workpiece by the workpiece holding mechanism 100. Therefore, the warp correction apparatus 80 of the present embodiment can prevent the electrostatic charging of the clean sheets 83 and 84 by the ion generator 86. Thus, the present invention can eliminate the problem caused by the clean sheets 83 and 84, etc., being electrostatically charged, and enables the correction operation by the warp correction apparatus 80 to be carried out without trouble.

Note that the plate-like workpiece is not limited to a frame unit of the flexure chain blank sheet, and the present invention may be applied to other types of plate-like workpieces. Depending on the type of plate-like workpiece, warping may be corrected such that the second surface becomes convex. Also, needless to say, in carrying out the present invention, each of the elements which constitute the warp correction apparatus may be modified variously, such as modifying the form, material, and arrangement of the elastic mat, first and second clean sheets, pressure roller, etc. For example, it is possible to structure the first sheet supply unit to be movable up and down, so that the first sheet may be moved up and down relative to the second sheet.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A warp correction apparatus which corrects warping of a plate-like workpiece, the plate-like workpiece having a first surface and a second surface that is opposite to the first surface, and the plate-like workpiece including a frame portion and a plurality of flexure elements which are arranged within the frame portion at predetermined pitches, each of the flexure elements comprising a circuit portion which is provided at the first surface and a metal base which is provided at the second surface, the warp correction apparatus comprising:

an elastic mat including a flat upper surface;
a first sheet supply unit comprising a supply bobbin configured to deliver a first clean sheet and a take-up bobbin configured to take up a used portion of the first clean sheet, the first sheet supply unit being configured to supply the first clean sheet on the upper surface of the elastic mat by delivering the first clean sheet in a longitudinal direction of the first clean sheet from the supply bobbin;
a workpiece holding mechanism configured to supply the plate-like workpiece onto the first clean sheet such that the circuit portion faces upward and such that a longitudinal direction of the flexure elements is parallel to the longitudinal direction of the first clean sheet;
a second sheet supply unit configured to supply a second clean sheet above the first clean sheet;
a first elevator unit configured to move the second clean sheet up and down relatively with respect to the first clean sheet;
a pressure roller which is movable up and down and disposed above the second clean sheet;
a second elevator unit configured to press the pressure roller toward the elastic mat; and
a roller moving mechanism configured to move the pressure roller along the upper surface of the elastic mat in the longitudinal direction of the flexure elements, in a state in which the pressure roller is lowered.

2. The warp correction apparatus of claim 1, wherein:
the elastic mat is formed of a resin foam having elasticity; and
the pressure roller is made of an elastic material harder than the elastic mat.

3. The warp correction apparatus of claim 2, wherein:
the second sheet supply unit includes a second supply bobbin configured to deliver an unused portion of the second clean sheet above the first clean sheet, and a second take-up bobbin configured to take up a used portion of the second clean sheet.

4. The warp correction apparatus of claim 3, further comprising an ion generator for preventing static electricity from accumulating on the first clean sheet and the second clean sheet.

5. The warp correction apparatus of claim 1, wherein:
the second sheet supply unit includes a second supply bobbin configured to deliver an unused portion of the second clean sheet above the first clean sheet, and a second take-up bobbin configured to take up a used portion of the second clean sheet.

6. The warp correction apparatus of claim 2, further comprising an ion generator for preventing static electricity from accumulating on the first clean sheet and the second clean sheet.

7. The warp correction apparatus of claim 5, further comprising an ion generator for preventing static electricity from accumulating on the first clean sheet and the second clean sheet.

8. The warp correction apparatus of claim 1, further comprising an ion generator for preventing static electricity from accumulating on the first clean sheet and the second clean sheet.

* * * * *